(12) United States Patent
Jones

(10) Patent No.: US 11,599,595 B2
(45) Date of Patent: *Mar. 7, 2023

(54) DETERMINING WHETHER TO PROCESS IDENTIFIED UNIFORM RESOURCE LOCATORS

(71) Applicant: International Business Machines Corporation, Armonk, NY (US)

(72) Inventor: Timothy F. Jones, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 526 days.

This patent is subject to a terminal disclaimer.

(21) Appl. No.: 15/793,877

(22) Filed: Oct. 25, 2017

(65) Prior Publication Data

US 2018/0046729 A1 Feb. 15, 2018

Related U.S. Application Data

(63) Continuation of application No. 15/156,119, filed on May 16, 2016.

(51) Int. Cl.
| | |
|---|---|
| *G06F 16/955* | (2019.01) |
| *H04L 67/02* | (2022.01) |
| *G06F 16/22* | (2019.01) |
| *H04L 67/1097* | (2022.01) |
| *G06F 16/951* | (2019.01) |

(52) U.S. Cl.
CPC ...... *G06F 16/9566* (2019.01); *G06F 16/2255* (2019.01); *G06F 16/951* (2019.01); *H04L 67/02* (2013.01); *H04L 67/1097* (2013.01)

(58) Field of Classification Search
CPC .............. G06F 16/9566; G06F 16/951; G06F 16/2255; H04L 67/02; H04L 67/1097
See application file for complete search history.

(56) References Cited

U.S. PATENT DOCUMENTS

| | | | |
|---|---|---|---|
| 8,136,025 B1* | 3/2012 | Zhu ................... | G06F 17/30864 707/634 |
| 8,666,991 B2 | 3/2014 | Peters et al. | |
| 9,985,978 B2* | 5/2018 | Smith ................. | G06F 21/565 |
| 2002/0048269 A1* | 4/2002 | Hong .................. | H04L 29/06 370/389 |
| 2003/0093645 A1* | 5/2003 | Wong ................. | G06F 12/0864 711/216 |
| 2008/0104113 A1* | 5/2008 | Wong ................. | G06F 16/9535 |
| 2008/0114739 A1 | 5/2008 | Hayes | |

(Continued)

OTHER PUBLICATIONS

Non-Final Office Action from U.S. Appl. No. 15/156,119, dated Apr. 16, 2018.

(Continued)

*Primary Examiner* — Huawen A Peng
(74) *Attorney, Agent, or Firm* — Zilka-Kotab, P.C.

(57) ABSTRACT

In one general embodiment, a computer-implemented method includes selecting a portion of a hash table, identifying a plurality of uniform resource locators (URLs) stored within the selected portion of the hash table, and for each of the plurality of identified URLs, individually determining whether to process the identified URL, based on data associated with the identified URL.

20 Claims, 6 Drawing Sheets

(56) References Cited

U.S. PATENT DOCUMENTS

| | | | | |
|---|---|---|---|---|
| 2011/0093533 A1* | 4/2011 | Kataria | ................ | G06F 16/972 |
| | | | | 709/203 |
| 2012/0158693 A1* | 6/2012 | Papadimitriou | ...... | G06F 16/951 |
| | | | | 707/708 |
| 2013/0046584 A1* | 2/2013 | Yu | ......................... | G06F 16/951 |
| | | | | 705/7.38 |
| 2017/0329860 A1* | 11/2017 | Jones | .................... | G06F 16/951 |
| 2022/0253509 A1* | 8/2022 | Cascaes | ............. | G06F 16/9566 |

OTHER PUBLICATIONS

Jones, T., U.S. Appl. No. 15/156,119, filed May 16, 2016.
List of IBM Patents or Patent Applications Treated as Related.
Final Office Action from U.S. Appl. No. 15/156,119, dated Dec. 20, 2018.
Advisory Action from U.S. Appl. No. 15/156,119, dated Mar. 25, 2019.
Non-Final Office Action from U.S. Appl. No. 15/156,119, dated Oct. 25, 2019.
Final Office Action from U.S. Appl. No. 15/156,119, dated May 11, 2020.
Advisory Action from U.S. Appl. No. 15/156,119, dated Jul. 2, 2020.
Non-Final Office Action from U.S. Appl. No. 15/156,119, dated Nov. 19, 2020.
Final Office Action from U.S. Appl. No. 15/156,119, dated Mar. 15, 2021.
Examiner's Answer to Appeal Brief from U.S. Appl. No. 15/156,119, dated Oct. 25, 2021.

\* cited by examiner

DETERMINING WHETHER TO PROCESS IDENTIFIED UNIFORM RESOURCE LOCATORS

BACKGROUND

The present invention relates to data analysis, and more specifically, this invention relates to determining web pages to crawl.

Web crawling is an important tool for analyzing and indexing web content, and organizing the web content before crawling it is a valuable process. However, current methods for organizing uniform resource locators (URLs) to be processed do not appropriately prioritize URLs, which results in situations where URLs that have not yet been explored are not prioritized over the URLs that have already been explored at least once, and where the same URL is crawled twice while other URLs remain un-crawled.

SUMMARY

A computer-implemented method according to one embodiment includes selecting a portion of a hash table, identifying a plurality of uniform resource locators (URLs) stored within the selected portion of the hash table, and for each of the plurality of identified URLs, individually determining whether to process the identified URL, based on data associated with the identified URL.

Other aspects and embodiments of the present invention will become apparent from the following detailed description, which, when taken in conjunction with the drawings, illustrate by way of example the principles of the invention.

DETAILED DESCRIPTION

Figure 1:
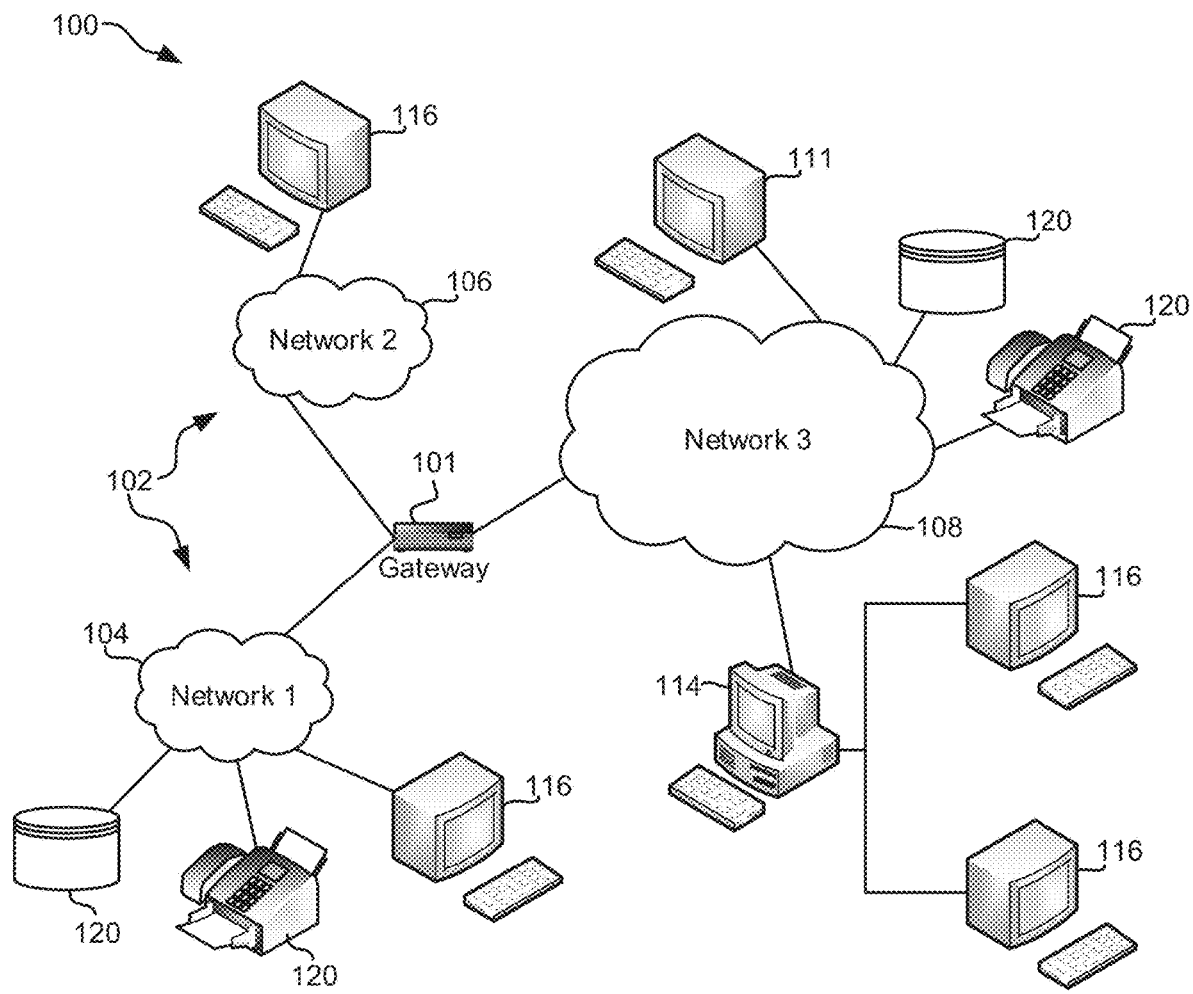
FIG. 1 illustrates a network architecture, in accordance with one embodiment.

The following description discloses several preferred embodiments of systems, methods and computer program products for determining whether to process a uniform resource locator (URL). Various embodiments provide a method to analyze both page-centric and global information in order to determine whether to crawl a web page located at a predetermined URL.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining whether to process a uniform resource locator (URL).

In one general embodiment, a computer-implemented method includes selecting a portion of a hash table, identifying a plurality of uniform resource locators (URLs) stored within the selected portion of the hash table, and for each of the plurality of identified URLs, individually determining whether to process the identified URL, based on data associated with the identified URL.

In another general embodiment, a computer program product for determining whether to process a uniform resource locator (URL) comprises a computer readable storage medium having program instructions embodied therewith, wherein the computer readable storage medium is not a transitory signal per se, and where the program instructions are executable by a processor to cause the processor to perform a method comprising selecting, by the processor, a portion of a hash table, identifying, by the processor, a plurality of uniform resource locators (URLs) stored within the selected portion of the hash table, and for each of the plurality of identified URLs, individually determining, by the processor, whether to process the identified URL, based on data associated with the identified URL.

In another general embodiment, a system includes a processor and logic integrated with and/or executable by the processor, the logic being configured to select a portion of a hash table, identify a plurality of uniform resource locators (URLs) stored within the selected portion of the hash table, and for each of the plurality of identified URLs, individually determine whether to process the identified URL, based on data associated with the identified URL.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
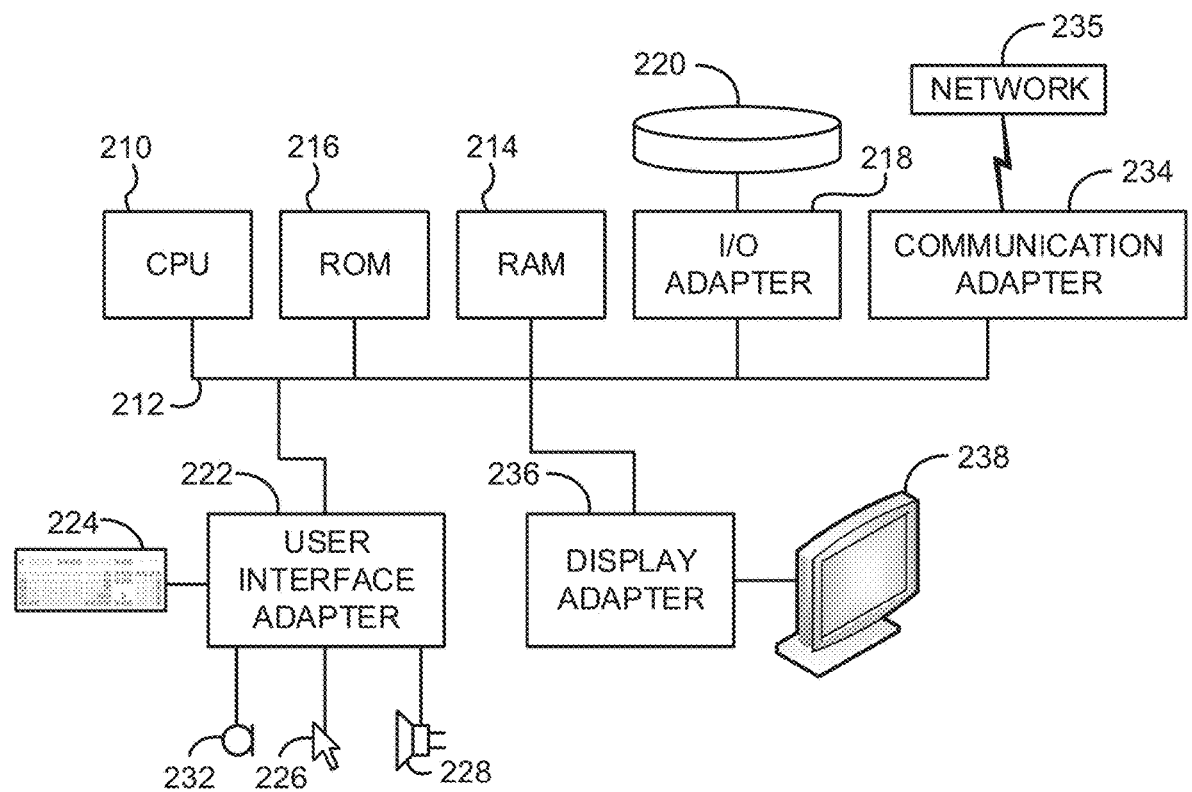
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
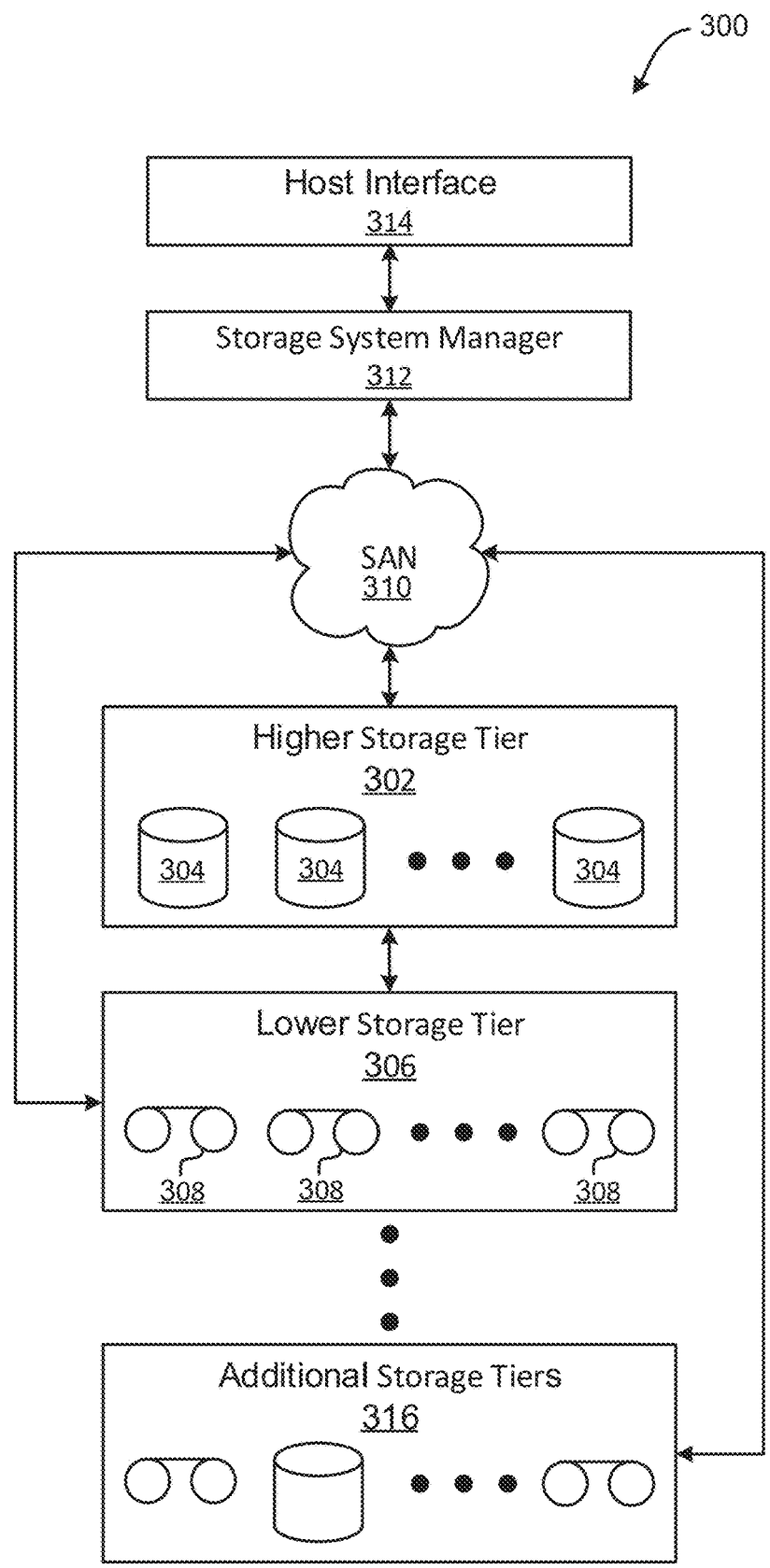
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
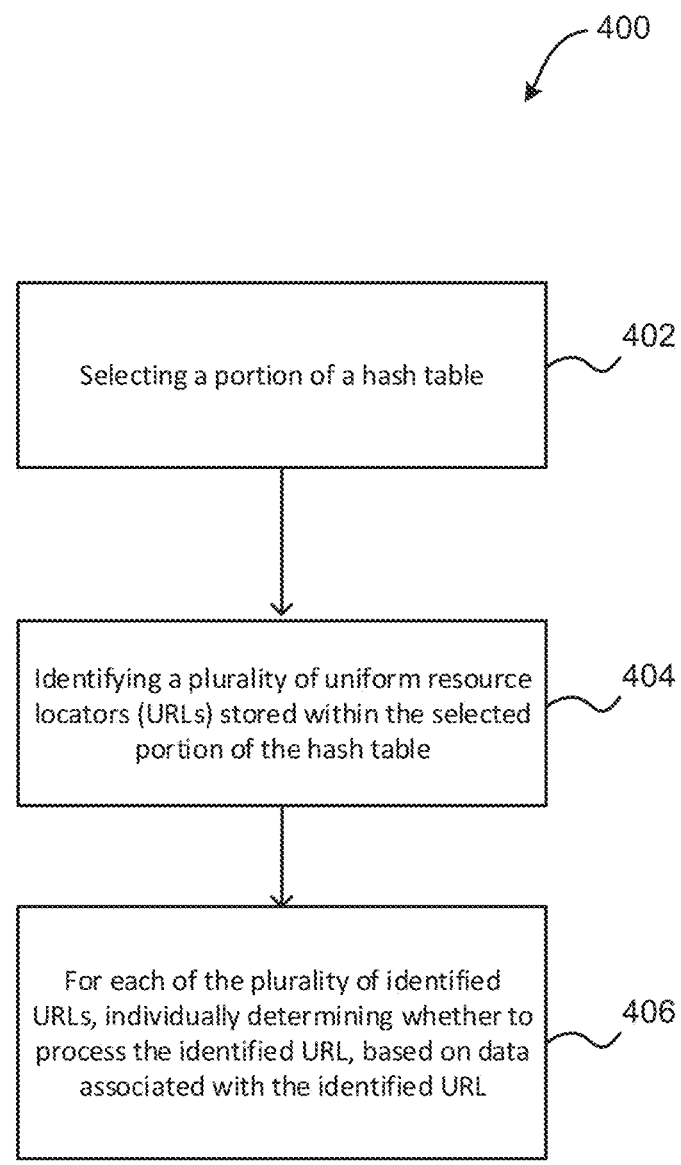
FIG. 4 illustrates a method for determining whether to process a uniform resource locator (URL), in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a portion of a hash table is selected. In one embodiment, the hash table may include a data structure storing a plurality of data. For example, the hash table may include a data structure that maps keys to values. In another embodiment, the portion of the hash table may include a bucket within the hash table. For example, a function (e.g., a hash function, etc.) may be used to divide an index of the hash table into a plurality of buckets, where each bucket represents a range of stored data (e.g. a range of stored digests, etc.).

Further still, as shown in FIG. 4, method 400 may proceed with operation 404, where a plurality of uniform resource locators (URLs) stored within the selected portion of the hash table are identified. In one embodiment, each portion of the hash table may contain a plurality of digests. For example, a plurality of digests may be distributed randomly among the plurality of buckets of the hash table, where each digest includes a sequence of bytes. In another embodiment, each of the plurality of digests may represent a uniform resource locator (URL). For example, each digest may represent an identified URL, where the text of the URL is converted into the sequence of bytes represented by the digest via a hash function (e.g., a cryptographic hash function, etc.).

Further, in one embodiment, each URL is represented only once within the hash table. For example, the hash table may include a plurality of unique digests each representative of a unique URL. In another embodiment, each of the plurality of digests may be associated with additional data. For example, each of the plurality of digests may be linked to data extracted from the web page (e.g., textual data, etc.) found at the URL represented by the digest, where the extracted data is stored with the digest in the hash table. In yet another embodiment, identifying the plurality of URLs may include identifying the plurality of unique digests representing those URLs.

Also, as shown in FIG. 4, method 400 may proceed with operation 406, where for each of the plurality of identified URLs, it is individually determined whether to process the identified URL, based on data associated with the identified URL. In one embodiment, the data associated with the identified URL may include metadata stored in the hash table in association with the digest representing the URL. In another embodiment, processing the URL may include crawling the web page found at the URL (e.g., browsing the web page, analyzing and extracting information found at the web page, etc.).

Also, in one embodiment, for an identified URL, the associated data may include a score (e.g., a page score, etc.) for the URL that is saved in the hash table in association with the URL/digest. For example, the page score for a URL may be determined based on information retrieved in association with the web page found at the URL. For instance, the information may include one or more of link authority, last crawl time, changes made to the page since last crawl, page change rate, page errors, a number of attempted page crawls, sub-crawl patterns, etc.

In addition, in one embodiment, for each of the plurality of identified URLs, it is individually determined whether to process the identified URL, based on global information associated with a full set of known URLs in addition to the data associated with the identified URL. For example, the global information associated with the full set of known URLs may include one or more environmental factors, including a time since a last crawl, a total number of pages crawled within the hash table, a total number of pages not crawled within the hash table, a percentage of a global crawl goal that is not currently met, a histogram of past page scores, etc.

Furthermore, in one embodiment, for each of the plurality of identified URLs, the data associated with the identified URL may be compared to one or more thresholds based on the global information associated with the full set of known URLs. For example, an overall score may be determined for the each of the plurality of identified URLs, utilizing the associated global information and associated data, and the overall score may be compared to a threshold score (e.g., an average overall score for all URLs within the hash table, etc.). In another embodiment, if the overall score for a URL meets and/or exceeds the threshold score, the URL associated with the score may be selected to be processed.

Further still, in one embodiment, the determination whether to process the identified URLs may start with a first listed URL within the selected portion of the hash table and may progress through all listed URLs within the selected portion of the hash table until all identified URLs within the selected portion of the hash table have been identified and analyzed. In another embodiment, when it is determined that a URL is to be processed, the web page found at the URL may be crawled immediately thereafter.

Also, in one embodiment, the selecting, identifying, and determining may be performed by a software application bot (e.g., and Internet bot, a web robot, etc.) of a computing device (e.g., a server, a cloud computing device, a personal computing device, a mobile computing device, a distributed computing device, etc.). For example, a plurality of bots may determine whether to crawl one or more URLs by reviewing metadata associated with digests of the URLs found within buckets of the hash table. In another embodiment, the plurality of bots may be synchronized using one or more combinators.

In this way, URLs may be crawled in an efficient manner (e.g., a more efficient manner than a priority queue, etc.).

This may result in more efficient processing, which may result in less power usage and increased performance by the computing device.

Figure 5:
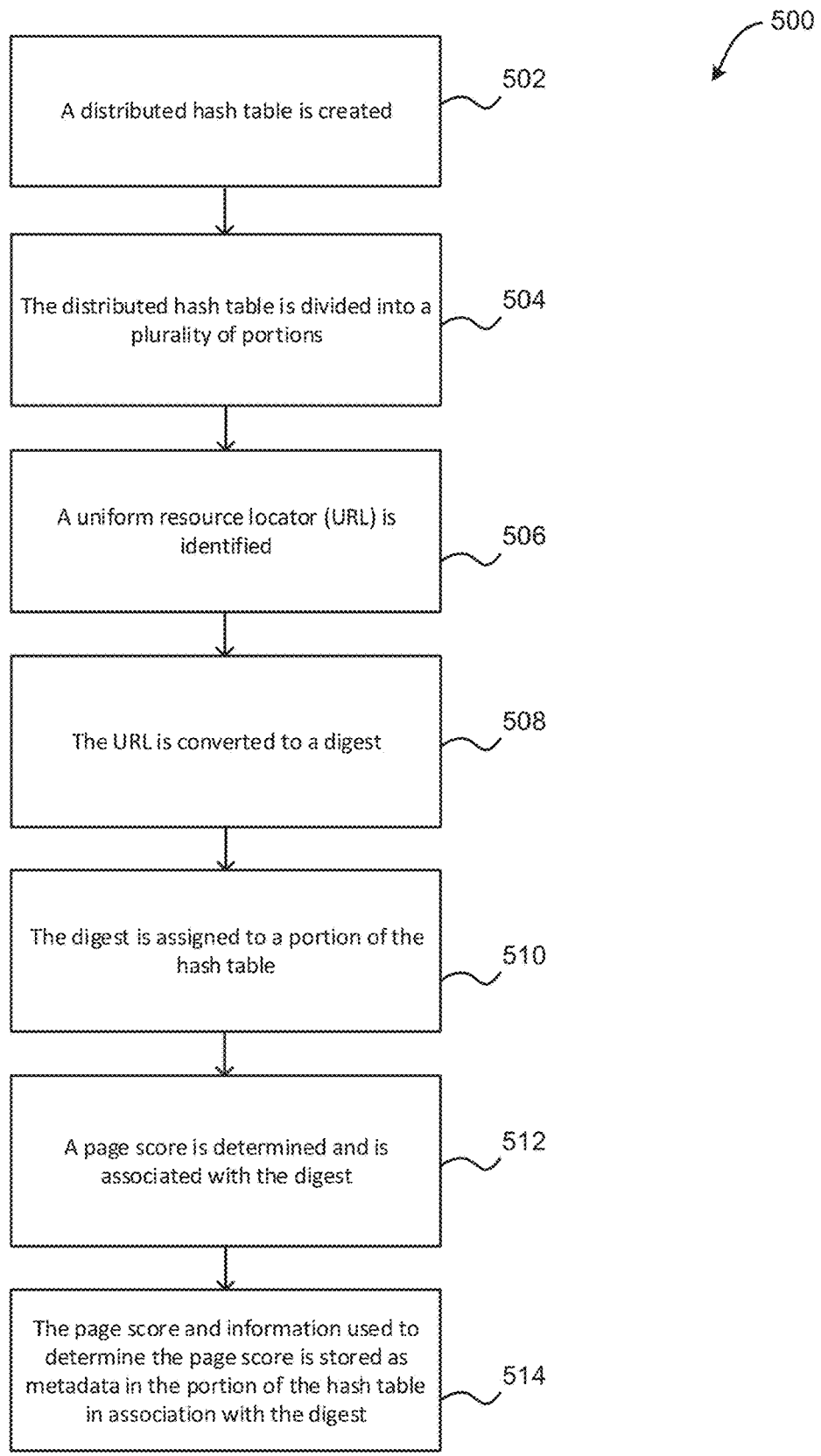
FIG. 5 illustrates a method for scoring URLs within a distributed hash table, in accordance with one embodiment.

Now referring to FIG. 5, a flowchart of a method 500 for scoring URLs within a distributed hash table is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a distributed hash table is created. In one embodiment, the distributed hash table may include a structure for storing data. Additionally, method 500 may proceed with operation 504, where the distributed hash table is divided into a plurality of portions. In one embodiment, each of the plurality of portions may include a bucket representative of a range of digest space. In this way, the entire hash table comprises a plurality of individual buckets.

Further, method 500 may proceed with operation 506, where a uniform resource locator (URL) is identified. In one embodiment, the URL may be identified as a result of crawling a web page located at another URL. In another embodiment, the URL may be identified as a result of crawling a web page located at the URL itself. Further still, method 500 may proceed with operation 508, where the URL is converted to a digest. In one embodiment, converting the URL to a digest may include converting the text of the URL to a binary digest comprising a sequence of bytes, using a cryptographic hash function.

Also, method 500 may proceed with operation 510, where the digest is assigned to a portion of the hash table. In one embodiment, assigning the digest may include mapping the digest to a bucket within the hash table. For example, if the hash table has N buckets, then the bucket number the digest is assigned to may be determined by calculating the (binary digest) MOD N. This may result in a randomized mapping/distribution of URLs to buckets within the hash table. In another embodiment, each bucket may represent an equal range within the digest space.

In addition, in one embodiment, each URL may be represented only once in the hash table. For example, each URL may have its own unique hash within the hash table. In another embodiment, if the digest associated with the URL already exists within the hash table, a count associated with the digest is incremented. For example, the count may be stored as metadata with the digest. In another embodiment, the count may be updated only once per source. For example, the count associated with the digest may be incremented only one time if the URL is encountered multiple times during a crawl of a web page. In this way, a probabilistic counter may be created that tracks a number of unique sources for each URL within the hash table.

Furthermore, method 500 may proceed with operation 512, where a page score is determined and is associated with the digest. In one embodiment, the page score may be determined based on a plurality of information retrieved in association with the page. For example, the page score may be based on a rank/link authority (e.g., a number of inbound links (unique sources/pages that link to the URL associated with the digest, etc.)). In another example, the page score may also be based on a time since the web page located at the URL was last crawled. In yet another example, the page score may also be based on an extent of changes made to the web page located at the URL since last crawl of the web page.

Further still, in one example, the page score may also be based on a rate at which the content of the web page located at the URL changes. In another example, the page score may also be based on any errors determined to be associated with the web page located at the URL. For instance, a lower page score may be determined for the digest if one or more errors occur when trying to crawl the web page located at the URL, one or more server errors exist at the web page located at the URL, a host associated with the web page located at the URL is unable to be reached, etc. In yet another example, the page score may also be based on a number of times a crawl was attempted for the web page located at the URL.

Also, in one example, the page score may also be based on one or more patterns associated with the URL. For instance, it may be determined if one or more sub-crawls/recipes exist for one or more posts/patterns to target within the web page located at the URL. For example, a higher page score may be determined for the digest if the web page located at the URL matches one or more predetermined sub-crawls/recipes.

Additionally method 500 may proceed with operation 514, where the page score and information used to determine the page score is stored as metadata in the portion of the hash table in association with the digest. In another embodiment, if the URL is identified during a crawl of the web page located at the URL, textual data extracted during the crawl of the web page may be stored in the bucket of the hash table in association with the digest. In this way, crawl data and page score data may be stored together within the hash table.

Figure 6:
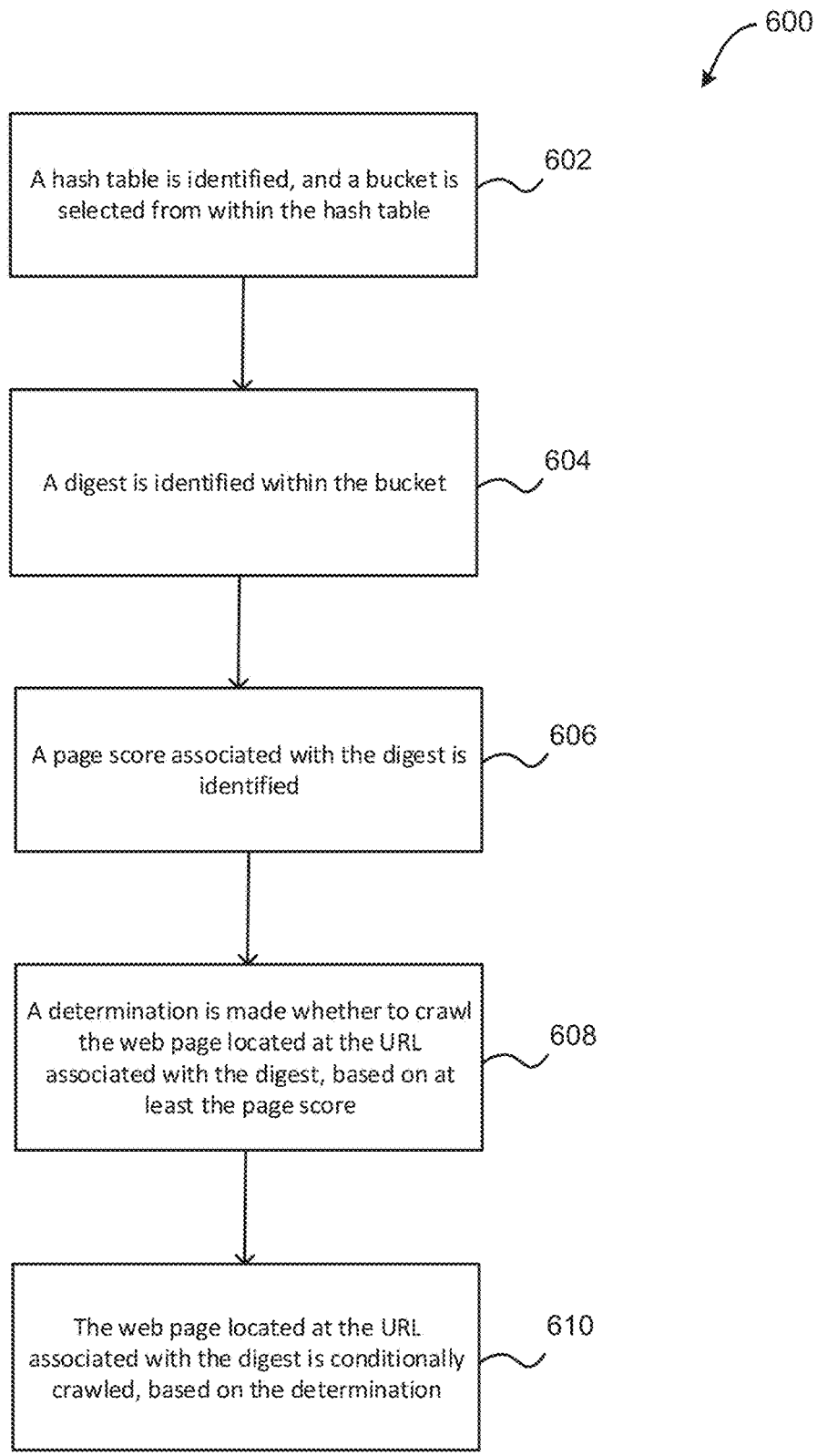
FIG. 6 illustrates a method for performing web crawling on a set of URLs, in accordance with one embodiment.

Now referring to FIG. 6, a flowchart of a method 600 for performing web crawling on a set of URLs is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a hash table is identified, and a bucket is selected from within the hash table. In one embodiment, the buckets within the hash table may be prioritized. For example, buckets that have been explored/crawled a smaller number of times may be prioritized over buckets that have been explored/crawled a greater number of times. In another embodiment, each bucket may have an associated count (e.g., a number of times the bucket has been explored/crawled, etc.), and the bucket explored/crawled the fewest number of times may be selected from within the hash table.

Additionally, in one embodiment, the web crawler may select the bucket by requesting a lock on the bucket from a synchronization mechanism. In another embodiment, the bucket may be selected according to a crawl queue with an iterator that maintains a count for each bucket within the hash table. In yet another embodiment, a web crawler may perform the hash table identifying and the bucket selecting. For example, the web crawler may include a bot and may be one of a plurality of web crawlers within a system.

Further, method 600 may proceed with operation 604, where a digest is identified within the bucket. In one embodiment, a web crawler may start at a beginning of the bucket and may review all digests within the bucket (e.g., from a start of the bucket to an end of the bucket, etc.). In another embodiment, the web crawler may look at every digest within the bucket and may make a decision whether to explore the URL associated with the digest (e.g., a yes or no decision, etc.).

Further still, method 600 may proceed with operation 606, where a page score associated with the digest is identified. In one embodiment, the page score may be stored as metadata in association with the digest in the bucket. Also, method 600 may proceed with operation 608, where a determination is made whether to crawl the web page located at the URL associated with the digest, based on at least the page score. In one embodiment, both a page score associated with the digest and global information associated with the digest may be analyzed (e.g., compared to one or more thresholds, etc.) in order to determine whether to crawl the web page located at the URL associated with the digest.

Also, in one embodiment, the global information associated with the digest may include one or more environmental factors. For example, the global information may include a time since a last crawl was performed on the web page located at the URL associated with the digest. In another example, the global information may include a count of a total number of web pages crawled within the hash table. In yet another example, the global information may include a count of a total number of web pages not crawled within the hash table. In still another example, the global information may include a percentage of a global web page crawl goal that is currently met, not currently met, etc.

In addition, in one example, the global information may include one or more past scores determined for one or more pages (e.g., located within a histogram of scores, etc.). In another example, the global information may include host level info. For instance, the global information may include an indication as to how many web pages have been seen across the entire Internet, how many web pages have been seen on a particular host, etc.

Furthermore, in one embodiment, determining whether to crawl the web page located at the URL associated with the digest may include comparing the global information and the page score to a threshold, further refining the global information and the page score based on one or more algorithms, etc. In another embodiment, the threshold may include a calculated average score for all pages in the hash table. In yet another embodiment, each digest within the bucket may be reviewed during one iteration/cycle, and each digest may be analyzed to determine whether to crawl the web page located at the URL associated with that digest.

Further still, method 600 may proceed with operation 610, where the web page located at the URL associated with the digest is conditionally crawled, based on the determination. In one embodiment, the web page located at the URL associated with the digest may be crawled if a determination is made to crawl the web page. In another embodiment, crawling the web page may include analyzing the web page at the URL, extracting textual data from the web page, add any new identified link URLs to hash table, adding to a count of identified link URLs already existing within the hash table (e.g., only once per page, etc.), saving extracted data to the digest in the bucket, updating metadata associated with the digest in the bucket, etc.

Also, in one embodiment, one iteration of digests have been identified and conditionally crawled in the bucket, another bucket is identified within the hash table, and the method is repeated. In another embodiment, all or a portion of the above method may be performed using a one or more bots/machines that are synchronized using one or more combinators.

In this way, URLs may be efficiently crawled, and URLs that are queued for crawling may be efficiently stored, which may increase an efficiency and fairness of a web crawler. Additionally, by effectively randomizing the distribution and crawl using the buckets, a re-crawl may be random across the entire hash table as well. As a benefit, the queue of URLs to be crawled may not be separated from the storage of the associated data, such that the queue and storage may be unified.

More specifically, enqueueing a URL for exploration/crawling may include adding an empty record for the URL to a bucket. By adding the hashed URL to the hash table immediately, it may be only added once, which may prevent duplicate additions of a URL to a crawler queue when the URL has already been previously crawled or queued. By performing crawling using distributed hash table with an iterator, access may be provided to a complete history of: how many times a URL has been crawled, the last time an attempt was made to crawl it, what content was obtained when it was crawled, etc.

This structure and implementation may allow for every known URL within a hash table to be explored in a timely fashion. In one embodiment, there may be an upper bound between how long it takes between seeing a URL and then seeing it again. In this manner, prioritization may be enabled by choosing to skip crawls on certain cycles. As the crawler iterates over each URL, the crawler may review all of the data accumulated for that URL (e.g., how many incoming links, page content, rate of change of page content, etc.), and may use that data to determine whether to fetch and crawl the URL on a given cycle. The way the machines synchronize with each other to determine which buckets they should be working on may be implemented using combinators.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    selecting one of a plurality of buckets within a hash table to be reviewed;
    identifying a plurality of uniform resource locators (URLs) stored within the selected bucket of the hash table;
    for each of the identified URLs, conditionally processing the identified URL, based on data associated with the identified URL, the processing including downloading a web page located at the URL,
    wherein conditionally processing the identified URL includes determining an overall score for the identified URL, based on global information associated with a plurality of known URLs in addition to metadata for the identified URL; and
    comparing the overall score to a threshold score,
    wherein the threshold score is an average overall score for all URLs within the hash table.

2. The computer-implemented method of claim 1, wherein the plurality of identified URLs are each represented only once within the hash table.

3. The computer-implemented method of claim 1, wherein the data associated with the identified URL includes metadata stored in the hash table in association with a digest representing the identified URL.

4. The computer-implemented method of claim 1, wherein processing the identified URL includes crawling a web page found at the identified URL, the crawling including:
    analyzing the web page found at the identified URL,
    extracting textual data from the web page,
    adding new identified link URLs to the hash table,
    adding to a count of identified link URLs already existing within the hash table,
    saving extracted data to an associated digest in the selected bucket, and
    updating metadata associated with the associated digest in the selected bucket.

5. The computer-implemented method of claim 1, wherein the data associated with the identified URL includes a page score for the identified URL that is saved in the hash table in association with the identified URL.

6. The computer-implemented method of claim 1, wherein the one of the plurality of buckets of the hash table contains a plurality of digests.

7. The computer-implemented method of claim 6, wherein each of the plurality of digests represents a unique URL.

8. The computer-implemented method of claim 6, wherein each of the plurality of digests is stored with data extracted from a web page.

9. The computer-implemented method of claim 1, further comprising individually determining, for each of the plurality of identified URLs, whether to process the identified URL, based on the data associated with the identified URL along with global information associated with a full set of known URLs.

10. The computer-implemented method of claim 9, wherein the data associated with the identified URL is compared to one or more thresholds based on the global information associated with the full set of known URLs.

11. The computer-implemented method of claim 1, wherein:
    each of the plurality of URLs is represented by a digest utilizing a cryptographic hash function,
    each of the plurality of buckets within the hash table includes a plurality of digests,
    digests are distributed randomly among the plurality of buckets within the hash table,
    each of the plurality of buckets represents an equal range within a digest space, and
    each digest is linked to data extracted from a web page found at a URL represented by the digest that is stored with the digest in the hash table.

12. The computer-implemented method of claim 1, wherein the data associated with the identified URL includes:
    a page score for the URL determined based on a link authority,
    a last crawl time,
    changes made to a web page associated with the URL since last crawl,
    a page change rate for the web page associated with the URL,
    a number of page errors within the web page associated with the URL,
    a number of attempted page crawls for the web page associated with the URL, and
    sub-crawl patterns for the web page associated with the URL.

13. The computer-implemented method of claim 1, wherein the identified URL is conditionally processed based on the data associated with the identified URL as well as global information associated with a full set of known URLs, the global information including:
    a time since a last crawl,
    a total number of web pages crawled within the hash table,
    a total number of web pages not crawled within the hash table,
    a percentage of a global crawl goal that is not currently met, and
    a histogram of past web page scores.

14. The computer-implemented method of claim 1, wherein the plurality of buckets within the hash table are prioritized, such that buckets that have been crawled a smaller number of times are prioritized over buckets that have been crawled a greater number of times.

15. The computer-implemented method of claim 1, wherein the global information is selected from the group consisting of: a time since a last crawl, a total number of pages crawled within the hash table, a total number of pages not crawled within the hash table, a percentage of a global crawl goal that is not currently met, and a histogram of past page scores; wherein the data associated with the identified URL is selected from the group consisting of: a page score for the URL determined based on a link authority, a last crawl time, changes made to a web page associated with the URL since last crawl, a page change rate for the web page associated with the URL, a number of page errors within the web page associated with the URL, a number of attempted page crawls for the web page associated with the URL, and sub-crawl patterns for the web page associated with the URL.

16. The computer-implemented method of claim 1, wherein one or more software application bots process the identified URL.

17. The computer-implemented method of claim 1, wherein a plurality of software application bots process the identified URL, wherein the bots are synchronized using one or more combinators.

18. A computer-implemented method, comprising:
selecting one of a plurality of buckets within a hash table to be reviewed;
identifying a plurality of uniform resource locators (URLs) stored within the selected bucket of the hash table; and
for each of the plurality of identified URLs, conditionally processing the identified URL, based on data associated with the identified URL,
wherein conditionally processing the identified URL includes:
  determining an overall score for the identified URL, based on global information associated with a full set of known URLs in addition to metadata for the identified URL, wherein:
    the global information includes a time since a last crawl, a total number of pages crawled within the hash table, a total number of pages not crawled within the hash table, and a percentage of a global crawl goal that is not currently met, and
    the metadata for the identified URL includes a page score for the URL based on a link authority for the URL, a last crawl time for the URL, and changes made to a page associated with the URL since a last crawl,
  comparing the overall score to a threshold score, where the threshold score is an average overall score for all URLs within the hash table, and
  processing the URL in response to determining that the overall score exceeds the threshold score.

19. The computer-implemented method of claim 18, wherein processing the URL in response to determining that the overall score exceeds the threshold score includes downloading a web page located at the URL.

20. A computer-implemented method, comprising:
selecting one of a plurality of buckets within a hash table to be reviewed;
identifying a plurality of uniform resource locators (URLs) stored within the selected bucket of the hash table; and
for each of the plurality of identified URLs, conditionally processing the identified URL, based on data associated with the identified URL,
wherein:
  each bucket represents a range of URLs, and each URL is represented once within the hash table,
  each of the URLs is stored within the bucket as a digest,
  each of the URLs is transformed into a sequence of bytes represented by the digest utilizing a hash function,
  the data associated with each of the URLs is linked to its associated digest and is stored with the digest within the hash table,
  the data associated with each of the URLs includes metadata including: a page score for the URL based on a link authority for the URL, a last crawl time for the URL, and changes made to a page associated with the URL since a last crawl;
and wherein conditionally processing the identified URL includes:
  determining an overall score for the identified URL, based on global information associated with a full set of known URLs in addition to the metadata for the identified URL, the global information including a time since a last crawl, a total number of pages crawled within the hash table, a total number of pages not crawled within the hash table, and a percentage of a global crawl goal that is not currently met,
  comparing the overall score to a threshold score, where the threshold score is an average overall score for all URLs within the hash table, and
  processing the URL in response to determining that the overall score exceeds the threshold score.

* * * * *